(12) United States Patent
Ikeda et al.

(10) Patent No.: US 9,694,772 B2
(45) Date of Patent: Jul. 4, 2017

(54) BATTERY MOUNTING STRUCTURE FOR VEHICLE

(71) Applicant: TOYOTA JIDOSHA KABUSHIKI KAISHA, Toyota-shi, Aichi-ken (JP)

(72) Inventors: Koki Ikeda, Toyota (JP); Kiyoshi Hokazono, Toyota (JP); Toshiya Miyashita, Toyota (JP); Tomohiro Sakurai, Toyota (JP); Kentaro Nakamura, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/760,109

(22) PCT Filed: Jan. 9, 2013

(86) PCT No.: PCT/JP2013/050244
§ 371 (c)(1),
(2) Date: Jul. 9, 2015

(87) PCT Pub. No.: WO2014/109024
PCT Pub. Date: Jul. 17, 2014

(65) Prior Publication Data
US 2015/0343971 A1    Dec. 3, 2015

(51) Int. Cl.
| | |
|---|---|
| *H01M 14/00* | (2006.01) |
| *B60R 16/04* | (2006.01) |
| *B60K 1/04* | (2006.01) |
| *H01M 2/10* | (2006.01) |

(52) U.S. Cl.
CPC ............ *B60R 16/04* (2013.01); *B60K 1/04* (2013.01); *H01M 2/1083* (2013.01); *B60K 2001/0438* (2013.01); *B60Y 2306/01* (2013.01)

(58) Field of Classification Search
CPC ............ B60K 1/04; B60K 2001/0438; H01M 2/1083; H01M 2/08; H01M 2/206; H01M 2/1061; H01M 2/1077; B60R 16/04; B60Y 2306/01
See application file for complete search history.

(56) References Cited

U.S. PATENT DOCUMENTS

| | | | |
|---|---|---|---|
| 6,040,080 A | 3/2000 | Minami et al. | |
| 6,085,854 A * | 7/2000 | Nishikawa | B60K 1/04 180/68.5 |
| 2006/0286441 A1 * | 12/2006 | Matsuoka | H01M 2/105 429/99 |
| 2008/0318119 A1 | 12/2008 | Watanabe et al. | |

(Continued)

FOREIGN PATENT DOCUMENTS

| | | |
|---|---|---|
| CN | 101128946 A | 2/2008 |
| JP | 3606415 B2 | 1/2005 |

(Continued)

*Primary Examiner* — Mark F Huff
*Assistant Examiner* — Monique Wills
(74) *Attorney, Agent, or Firm* — Oliff PLC

(57) ABSTRACT

A battery mounting structure for a vehicle includes: a battery frame made of fiber reinforced resin and fastened and fixed to a vehicle body via a plurality of first fastening portions; a battery fastened and fixed to the battery frame via a plurality of second fastening portions; and a ductile member provided between the first fastening portion and the second fastening portion.

7 Claims, 15 Drawing Sheets

(56) References Cited

U.S. PATENT DOCUMENTS

| | | | | |
|---|---|---|---|---|
| 2009/0236162 A1* | 9/2009 | Takasaki | ............... | B60K 1/04 |
| | | | | 180/68.5 |
| 2010/0119931 A1* | 5/2010 | Shishido | ............ | H01M 2/1072 |
| | | | | 429/153 |

FOREIGN PATENT DOCUMENTS

| JP | 2008-094146 A | 4/2008 |
|---|---|---|
| JP | 2008-277049 A | 11/2008 |
| JP | 4924684 B2 | 4/2012 |
| JP | 2012-101663 A | 5/2012 |

* cited by examiner

BATTERY MOUNTING STRUCTURE FOR VEHICLE

TECHNICAL FIELD

The present invention relates to a battery mounting structure for a vehicle.

BACKGROUND ART

Such a structure has been conventionally known that a battery frame for supporting a driving battery (battery) placed at a lower side relative to a floor portion of an electric vehicle is molded by use of a fiber reinforced resin material and fixed to side frames (at a vehicle-body side) placed at right and left sides of a bottom face of the floor portion (for example, see Japanese Patent No. 3606415):

SUMMARY OF THE INVENTION

Problem to be Solved by the Invention

However, the driving battery is supported by the side frames via the battery frame made of fiber reinforced resin. Because of this, when a collision load is input into the battery frame at the time of a collision of the vehicle, a crack might occur in the battery frame, so that the driving battery might fall off the battery frame. As such, there is room for improvement for a structure that restrains a driving battery from falling off a battery frame when a collision load is input into the battery frame.

In view of this, the present invention is intended to provide a battery mounting structure for a vehicle which can restrain a battery from falling off a battery frame made of fiber reinforced resin even when a load is input into the battery frame.

Means for Solving the Problem in order to achieve the above object, a battery mounting structure for a vehicle according to a first aspect of the present invention includes: a battery frame made of fiber reinforced resin and fastened and fixed to a vehicle body via a plurality of first fastening portions; a battery fastened and fixed to the battery frame via a plurality of second fastening portions; and a ductile member provided over the first fastening portion and the second fastening portion.

According to the first aspect of the present invention, the ductile member is provided over the first fastening portion for fastening and fixing the battery frame to the vehicle body and the second fastening portion for fastening and fixing the battery to the battery frame. Accordingly, even if a load is input into the battery frame made of fiber reinforced resin and a crack occurs between the first fastening portion and the second fastening portion, the ductile member restrains the battery from falling off the battery frame.

Further, a battery mounting structure for a vehicle according to a second aspect of the present invention is configured such that, in the battery mounting structure for a vehicle according to the first aspect, the ductile member is provided over the first fastening portion and the second fastening portion adjacent to each other.

According to the second aspect of the present invention, the ductile member is provided over the first fastening portion and the second fastening portion adjacent to each other. Accordingly, the ductile member can be configured in a compact manner, thereby making it possible to restrain an increase in weight and an increase in cost caused by providing the ductile member.

Further, a battery mounting structure for a vehicle according to a third aspect of the present invention is configured such that, in the battery mounting structure for a vehicle according to the first aspect, a plurality of fastening pairs each including the first fastening portion and the second fastening portion adjacent to each other is placed so as to be distanced from each other in a vehicle-body front-rear direction and in a vehicle width direction, and the ductile member is extended so as to connect the plurality of fastening pairs in the vehicle-body front-rear direction or in the vehicle width direction.

According to the third aspect of the present invention, the plurality of fastening pairs each including the first fastening portion and the second fastening portion adjacent to each other and placed so as to be distanced from each other in the vehicle-body front-rear direction and in the vehicle width direction is connected to each other by the ductile member extended in the vehicle-body front-rear direction or the ductile member extended in the vehicle width direction. Accordingly, in a case where the fastening pairs are connected to each other by the ductile member extended in the vehicle-body front-rear direction, even if a load is input from the vehicle width direction and a crack occurs between the fastening pairs, it is possible to stably restrain the battery from falling off the battery frame. Further, in a case where the fastening pairs are connected to each other by the ductile member extended in the vehicle width direction, even if a load is input from the vehicle-body front-rear direction and a crack occurs between the fastening pairs, it is possible to stably restrain the battery from falling off the battery frame.

Further, a battery mounting structure for a vehicle according to a fourth aspect of the present invention is configured such that, in the battery mounting structure for a vehicle according to the first aspect, a plurality of fastening pairs each including the first fastening portion and the second fastening portion adjacent to each other is placed so as to be distanced from each other in a vehicle-body front-rear direction and in a vehicle width direction, and the ductile member is extended so as to connect the plurality of fastening pairs in the vehicle-body front-rear direction and in the vehicle width direction.

According to the fourth aspect of the present invention, the plurality of fastening pairs each including the first fastening portion and the second fastening portion adjacent to each other and placed so as to be distanced from each other in the vehicle-body front-rear direction and in the vehicle width direction is connected to each other by the ductile members extended in the vehicle-body front-rear direction and in the vehicle width direction. Accordingly, even if a load is input from the vehicle width direction or from the vehicle-body front-rear direction and a crack occurs between the fastening pairs, it is possible to stably restrain the battery from falling off the battery frame.

Further, a battery mounting structure for a vehicle according to a fifth aspect of the present invention is configured such that, in the battery mounting structure for a vehicle according to any of the first to fourth aspects, the ductile member is formed in a flat shape.

According to the fifth aspect of the present invention, the ductile member is formed in a flat shape. Accordingly, the ductile member can be configured in a simple manner.

Further, a battery mounting structure for a vehicle according to a sixth aspect of the present invention is configured such that, in the battery mounting structure for a vehicle according to any of the first to fourth aspects, the battery frame includes a battery frame upper and a battery frame lower configured such that their outer peripheral portions are joined to each other so as to form a closed section, and the ductile member is provided inside the closed section.

According to the sixth aspect of the present invention, the ductile member is provided inside the battery frame having a closed section structure. Accordingly, even if a load is input into the battery frame, it is possible to effectively restrain a crack from occurring in the battery frame and to more stably restrain the battery from falling off the battery frame.

Further, a battery mounting structure for a vehicle according to a seventh aspect of the present invention is configured such that, in the battery mounting structure for a vehicle according to the sixth aspect, the ductile member includes an upper member and a lower member configured such that their flange portions are joined to each other so as to form a closed section, and a flange portion of the upper member and a flange portion of the lower member, in the outer peripheral portion side, are sandwiched between the outer peripheral portion of the battery frame upper and the outer peripheral portion of the battery frame lower, so as to be joined to each other.

According to the seventh aspect of the present invention, the ductile member has a closed section structure, and the flange portion of the upper member and the flange portion of the lower member are sandwiched between the outer peripheral portion of the battery frame upper and the outer peripheral portion of the battery frame lower, so as to be joined to each other. This accordingly improves an impact resistance of the battery frame. Accordingly, even if a load is input into the battery frame, it is possible to more effectively restrain a crack from occurring in the battery frame. Hereby, it is possible to more stably restrain the battery from falling off the battery frame.

Advantageous Effects of Invention

As described above, according to the first aspect of the present invention, even if a load is input into the battery frame made of fiber reinforced resin, it is possible to restrain the battery from falling off the battery frame.

According to the second aspect of the present invention, it is possible to configure the ductile member in a compact manner and to restrain an increase in weight and an increase in manufacturing cost.

According to the third aspect of the present invention, even if a load is input into the battery frame made of fiber reinforced resin from the vehicle width direction or the vehicle-body front-rear direction, it is possible to stably restrain the battery from falling off the battery frame.

According to the fourth aspect of the present invention, even if a load is input into the battery frame made of fiber reinforced resin from the vehicle width direction or the vehicle-body front-rear direction, it is possible to stably restrain the battery from falling off the battery frame.

According to the fifth aspect of the present invention, it is possible to configure the ductile member in a simple manner.

According to the sixth aspect of the present invention, even if a load is input into the battery frame made of fiber reinforced resin, it is possible to more stably restrain the battery from falling off the battery frame.

According to the seventh aspect of the present invention, it is possible to improve an impact resistance of the battery frame made of fiber reinforced resin, and even if a load is input into the battery frame, it is possible to more stably restrain the battery from falling off the battery frame.

MODES FOR CARRYING OUT THE INVENTION

Details of embodiments of the present invention will be described below with reference to drawings. Note that, for the convenience of the description, in each of the drawings, an arrow UP indicates a vehicle-body upward direction, an arrow FR indicates a vehicle-body forward direction, and an arrow OUT indicates an outer side in a vehicle width direction. Further, in the following description, in a case where up and down directions, front and rear directions, and right and left directions are described without any special description, they respectively indicate up and down of a vehicle-body up-down direction, front and rear of a vehicle-body front-rear direction; and right and left of a vehicle-body right-left direction (a vehicle width direction).

First Embodiment

Figure 1:
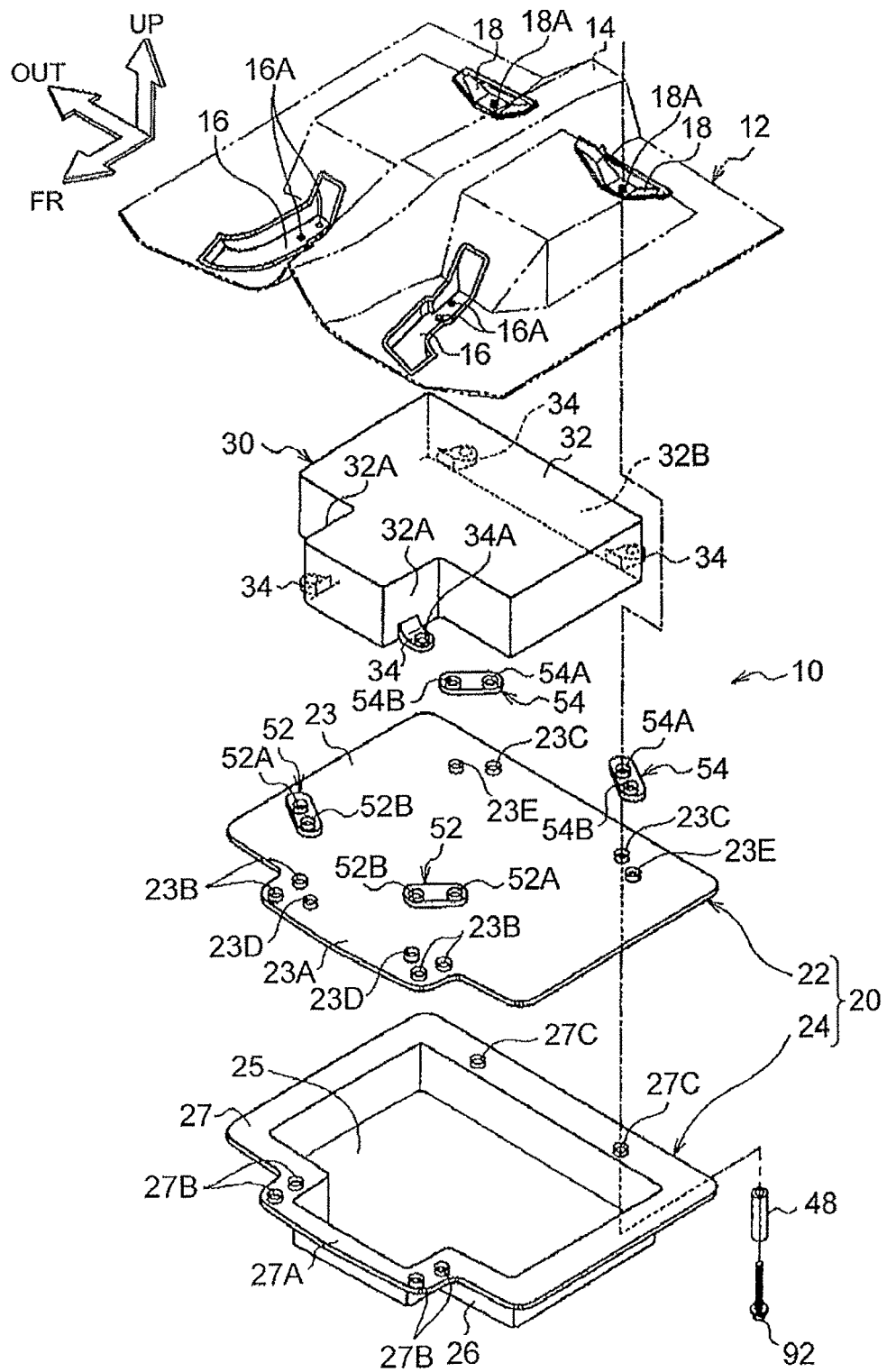
FIG. 1 is an exploded perspective view illustrating a battery mounting structure for a vehicle according to a first embodiment.
Figure 2:
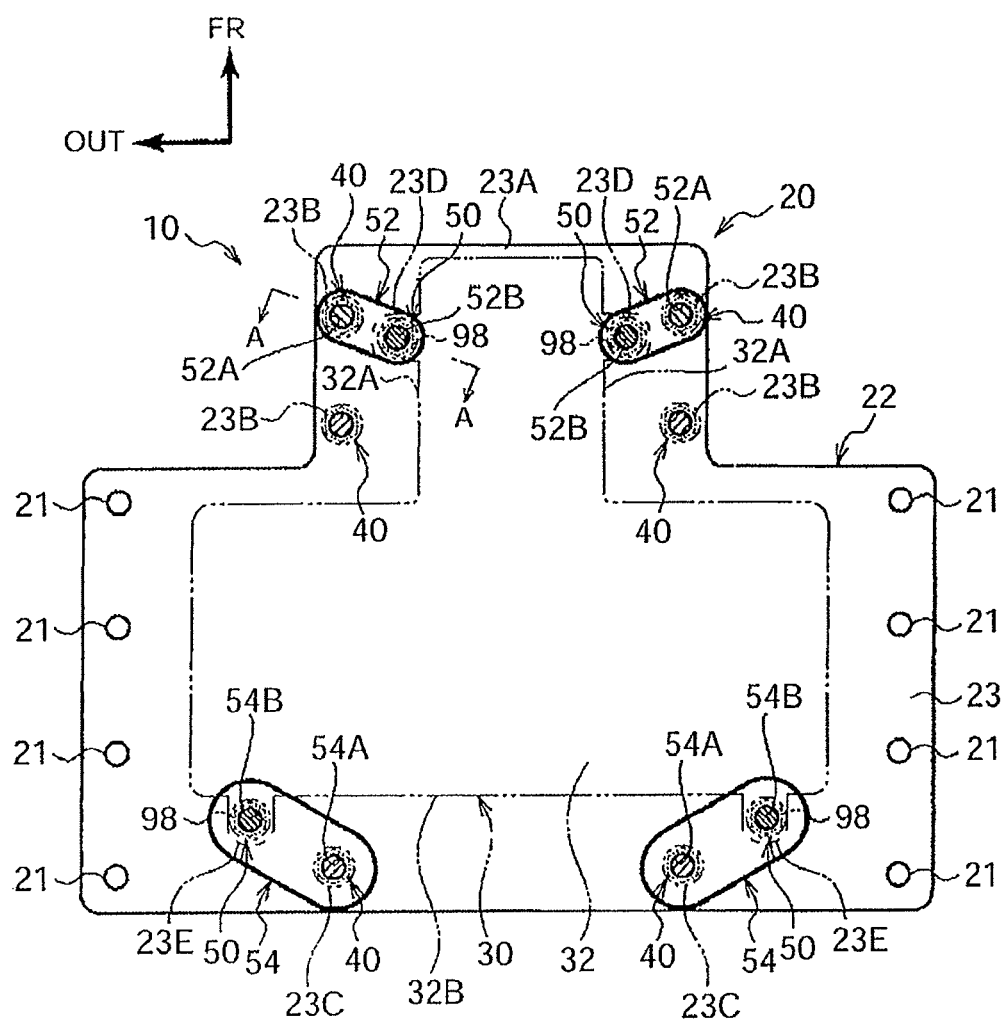
FIG. 2 is a plan view illustrating the battery mounting structure for a vehicle according to the first embodiment.
Figure 3:
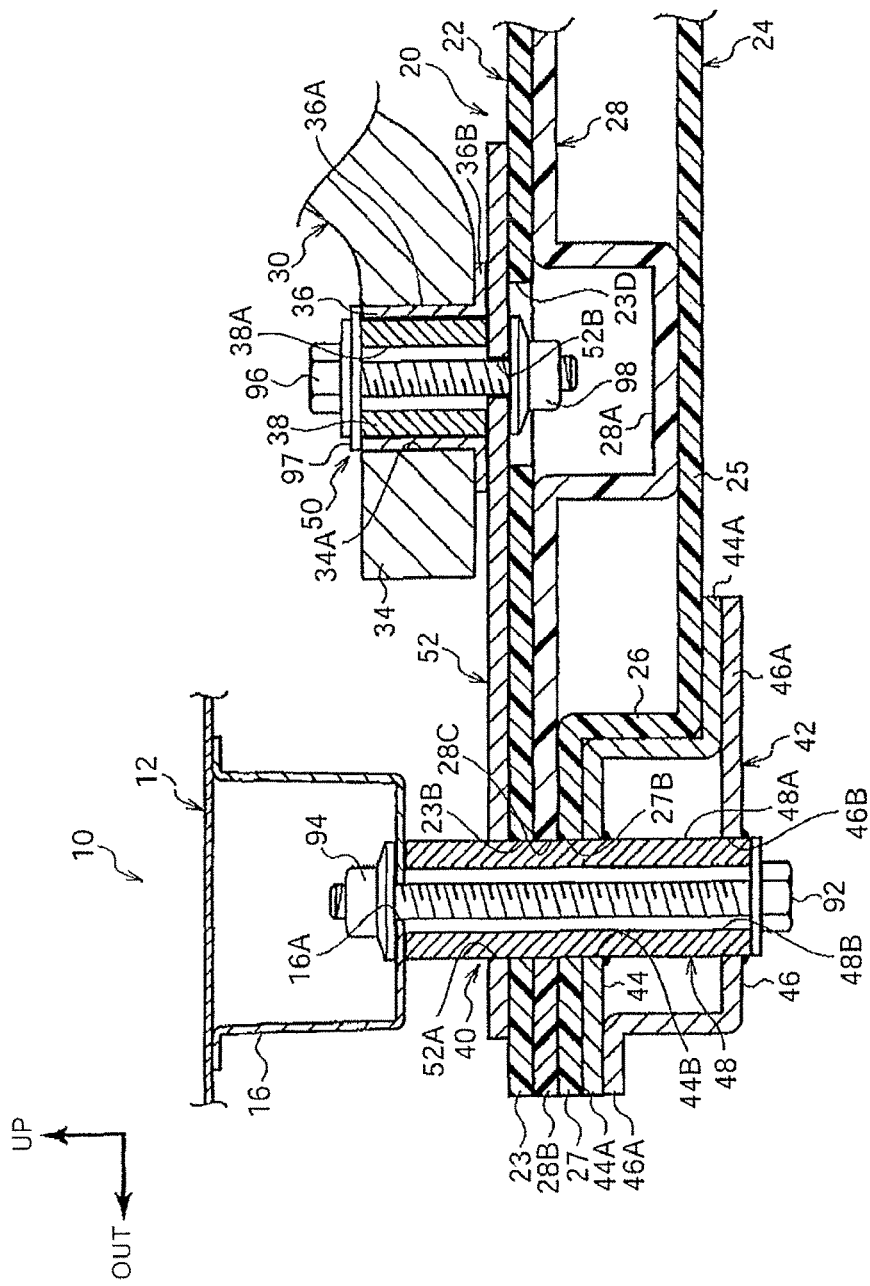
FIG. 3 is a sectional view taken along an arrow A-A in FIG. 2.

Initially described is a first embodiment. As illustrated in FIGS. 1 to 3, a battery mounting structure 10 for a vehicle, according to the present embodiment, which is applied to a vehicle such as an electric vehicle includes: a battery frame (a stack frame) 20 made of fiber reinforced resin and fastened and fixed, via a plurality of first fastening portions 40, to a metal floor panel (a vehicle body) 12 constituting a floor of the vehicle; a fuel cell stack 30 as a battery fastened and fixed to the battery frame 20 via a plurality of second fastening portions 50; and a plurality of (e.g., two) ductile members 52, 54 each provided over the first fastening portion 40 and the second fastening portion 50.

The floor panel 12 includes a tunnel portion 14 provided in its central part in the vehicle width direction and extending in the vehicle-body front-rear direction, and paired right and left front mounting portions 16 each having a recessed sectional shape when viewed from the vehicle-body front-rear direction are provided on vehicle-body front sides of both right and left sides of the tunnel portion 14. Further, paired right and left rear mounting portions 18 each having a recessed sectional shape when viewed from the vehicle width direction are provided on vehicle-body rear sides of both right and left sides of the tunnel portion 14.

Each of the front mounting portions 16 is provided with two through holes 16A aligned in the vehicle-body front-rear direction and configured to pass flange bolts 92 therethrough, and each of the rear mounting portions 18 is provided with one through hole 18A configured to pass a flange bolt 92 therethrough. When the battery frame 20 is fastened and fixed, with the flange bolts 92 and nuts 94, to each of the front mounting portions 16 and each of the rear mounting portions 18, the battery frame 20 is placed at a vehicle-body lower side relative to the floor panel 12 (see FIG. 3).

The battery frame 20 includes at least a flat upper frame 22 as a battery frame upper, and a tray-shaped lower frame 24 as a battery frame lower. As illustrated in FIG. 2, the upper frame 22 is formed in a "projection" shape, in a plan view, in which a front central part projects toward a vehicle-body front side so as to fit a shape of the after-mentioned outer packaging portion 32 of the fuel cell stack 30, and the lower frame 24 is also formed in a "projection" shape in a plan view.

More specifically, as illustrated in FIG. 1, the lower frame 24 includes: a flat bottom portion 25 formed in a "projection" shape in a plan view; a side wall portion 26 provided in a standing manner so as to be integrated with a peripheral part of the bottom portion 25; and a flat overhanging portion (an outer peripheral portion) 27 that overhangs outwardly from an upper end of the side wall portion 26 in an integrated manner. An outer shape including the overhanging portion 27 in a plan view has the same size as the upper frame 22.

When the overhanging portion 27 of the lower frame 24 is joined to an outer peripheral portion 23 of the upper frame 22 with an adhesive and bolts/nuts (not shown), the battery frame 20 is configured to have a rectangular closed-section structure. Accordingly, a plurality of (e.g., four) through holes 21 configured to pass bolts therethrough is formed at both right and left side parts of the outer peripheral portion 23 (the overhanging portion 27) (see FIG. 2).

Further, that front central part of the outer peripheral portion 23 which projects toward the vehicle-body front side is a projecting portion 23A, and that front central part of the overhanging portion 27 which projects toward the vehicle-body front side is a projecting portion 27A. Two through holes 23B aligned in the vehicle-body front-rear direction are formed in each of the right and left side parts of the projecting portion 23A of the outer peripheral portion 23, and one through hole 23C is formed in each of right and left sides of a rear end of the outer peripheral portion 23, Further, two through holes 27B aligned in the vehicle-body front-rear direction (so as to communicate with the through holes 23B) are formed in each of the right and left side parts of the projecting portion 27A of the overhanging portion 27, and one through hole 27C (communicating with the through hole 23C) is formed in each of right and left sides of a rear end of the overhanging portion 27. These through holes 23B, 23C, 27B, 27C serve as insertion holes for collar members 48 and flange bolts 92 to fasten the battery frame 20 to the floor panel 12 (see FIGS. 1, 3).

Further, the projecting portion 23A of the outer peripheral portion 23 is provided with one through hole 23D adjacently at an inner side, in the vehicle width direction, relative to the two through holes 23B. Each of the right and left sides of the rear end of the outer peripheral portion 23 is provided with one through hole 23E adjacently at an outer side, in the vehicle width direction, relative to the one through hole 23C. Each of the through holes 23D, 23E serves as a spill port for a weld nut 98 for fastening the after-mentioned fuel cell stack 30 to the battery frame 20 (see FIG. 3).

Note that, as illustrated in FIG. 3, a reinforcing frame 28 made of fiber reinforced resin may be provided, as an intermediate member, between the upper frame 22 and the lower frame 24, so as to configure the battery frame 20 to have a closed section shape. The reinforcing frame 28 is provided integrally with a plurality of recessed portions 28A extending in the vehicle-body front-rear direction, and a bottom face of each of the recessed portions 28A is joined to a top face of the bottom portion 25 of the lower frame 24 with an adhesive.

A top face of the reinforcing frame 28 is joined to a bottom face of the upper frame 22 with an adhesive, and an outer peripheral portion 28B of the reinforcing frame 28 is sandwiched between the outer peripheral portion 23 of the upper frame 22 and the overhanging portion 27 of the lower frame 24, so that they are joined to each other. The reinforcing frame 28 improves strength (rigidity) of the battery frame 20.

Note that the reinforcing frame 28 illustrated herein is configured such that its recessed portions 28A are formed at positions corresponding to the through holes 23D, 23E, so as to be able to receive the weld nuts 98. Further, through holes 28C configured to pass the collar members 48 therethrough are formed in the outer peripheral portion 28B of the reinforcing frame 28.

As illustrated in FIGS. 1 to 3, the fuel cell stack 30 is configured such that its outer packaging portion 32 is made of metal (or resin) in a box shape having a projecting shape in a plan view, and leg portions 34 projecting outward are formed integrally at a plurality of parts of a bottom-end periphery of the outer packaging portion 32. More specifically, the leg portions 34 are provided, in a projecting manner, in lower ends of both right and left side walls 32A of that front central part of the outer packaging portion 32 which projects toward the vehicle-body front side, and in lower ends of right and left sides of a rear wall 32B of the outer packaging section 32.

Each of the leg portions 34 is provided with a through hole 34A configured to pass the after-mentioned collar member 38 and flange bolt 96 therethrough. Note that a cylindrical member 36 with a reinforcement flange is inserted into each through hole 34A from a vehicle-body lower side, and an outer peripheral surface of a cylindrical portion 36A as its shaft center portion is joined to an inner peripheral surface of the each through hole 34A with an adhesive.

When the fuel cell stack 30 is fastened to the battery frame 20, the cylindrical collar member 38 is inserted into a through hole of the cylindrical portion 36A of the cylindrical member 36, so that a bottom end surface of the collar member 38 and a bottom face of a flange portion 36B of the cylindrical member 36 make contact with a top face of the after-mentioned ductile member 52, 54 (see FIG. 3).

As illustrated in FIGS. 1 to 3, on a top side of the upper frame 22, generally elliptical ductile members 52, 54 are provided, respectively, over the front-side through hole 23B (a first fastening portion 40) and the through hole 23D (a second fastening portion 50) adjacent to each other, and over the through hole 23C (a first fastening portion 40) and the through hole 23E (a second fastening portion 50) adjacent to each other.

Each of the ductile members 52, 54 is molded into a flat shape by use of a high strength steel plate or an ultrahigh strength steel plate, for example. Through holes 52A, 52B communicating with the through holes 23B, 23D, and through holes 54A, 54B communicating with the through holes 23C, 23E are formed at respective both ends of the ductile members 52, 54.

Further, as illustrated in FIG. 2, sizes of the ductile member 52 and the ductile member 54 are determined appropriately according to a distance between the through hole 23B and the through hole 23D adjacent to each other, and a distance between the through hole 23C and the through hole 23E adjacent to each other, respectively. Accordingly, in a case of the battery frame 20 illustrated herein, the ductile member 54 is formed to have a size larger than the ductile member 52.

Further, each of the ductile members 52, 54 is joined to a top face of the upper frame 22 with an adhesive, so as to be integrated with the upper frame 22. As illustrated in FIG. 3, the weld nut 98 coaxially communicating with the through hole 52B, 54B is provided in advance on a bottom face of an inner end, in the vehicle width direction, of the ductile member 52, 54.

Further, as illustrated in FIG. 3, a metal reinforcing member 42 covering at least the side wall portion 26 is provided at a lower side of the overhanging portion 27 of the battery frame 20. The reinforcing member 42 is configured to have a closed section shape by joining a flange portion 44A of the upper panel 44 to a flange portion 46A of the lower panel 46, and through holes 44B, 46B communicating with each other in a vehicle-body up-down direction are formed in the upper panel 44 and the lower panel 46, respectively.

The cylindrical collar member 48 made of metal (e.g., iron) is passed through the through holes 44B, 46B, and its outer peripheral surface 48A is joined to the upper panel 44 and the lower panel 46 by welding. Further, the collar member 48 projects toward the vehicle-body upper side from the top face of the upper panel 44, so as to be passed through the through holes 27B, 23B, 52A or the through holes 27C, 23C, 54A.

Note that the upper panel 44 of the reinforcing member 42 is joined to a bottom face of the overhanging portion 27, an external surface of the side wall portion 26, and a part of a bottom face of the bottom portion 25 with an adhesive. Accordingly, as illustrated in FIG. 3, the upper panel 44 is configured such that its inner side in the vehicle width direction is bent to have a generally "L" shaped section so as to follow shapes of the overhanging portion 27, the side wall portion 26, and the bottom portion 25. The lower panel 46 is configured such that its outer side in the vehicle width direction is bent to have a generally reversed "L" shaped section so as to form a rectangular closed section shape with the upper panel 44.

Here, a structure of the first fastening portion 40 of the battery frame 20 relative to the floor panel 12 and a structure of the second fastening portion 50 of the fuel cell stack 30 relative to the battery frame 20 are described. Note that the first fastening portion 40 and the second fastening portion 50 provided on a ductile-member-52 side have the same structures as the first fastening portion 40 and the second fastening portion 50 provided on a ductile-member-54 side. Accordingly, the following describes the ductile-member-52 side as an example.

Initially described is the first fastening portion 40. As illustrated in FIG. 3, the collar member 48 is passed through the through holes 44B, 46B of the reinforcing member 42, so as to be joined to the reinforcing member 42. Accordingly, when the reinforcing member 42 is attached to the lower side of the overhanging portion 27, the collar member 48 is passed, from the vehicle-body lower side, through each of the through holes 27B, 23B of the overhanging portion 27 (the projecting portion 27A) and the outer peripheral portion 23 (the projecting portion 23A), and the through hole 52A of the ductile member 52.

Then, the flange bolt 92 is passed through the through hole 48B of the collar member 48 from the vehicle-body lower side, so as to project toward the vehicle-body upper side from the through hole 16A formed in the front mounting portion 16 of the floor panel 12, and then, the flange bolt 92 is threadedly engaged with a nut 94. Note that the flange bolt 92 is also fastened on the ductile-member-54 side, namely, on a rear-mounting-portion-18 side, in the same manner. Hereby, the battery frame 20 is fastened and fixed to the floor panel 12. A fastening part including the collar member 48 serves as the first fastening portion 40.

Next will be described the second fastening portion 50. As illustrated in FIG. 3, the leg portion 34 (more specifically, the flange portion 36B of the cylindrical member 36 provided integrally with the through hole 34A) of the fuel cell stack 30 is placed on a top face of the battery frame 20 (the upper frame 22). Then, the collar member 38 is inserted from the vehicle-body upper side into the through hole of the cylindrical member 36, so as to be passed through the through hole 38A of the collar member 38 and the through hole 52B of the ductile member 52.

Subsequently, the flange bolt 96 to which a washer 97 having an outside diameter larger than an outside diameter of the cylindrical member 36 is fitted is inserted from the vehicle-body upper side into the through hole 38A of the collar member 38, so as to be threadedly engaged with the weld nut 98 provided on the bottom face of the ductile member 52. Note that the flange bolt 96 is also fastened on the ductile-member-54 side in the same manner. Hereby, the fuel cell stack 30 is fastened and fixed to the battery frame 20, and its fastening part serves as the second fastening portion 50. That is, the fuel cell stack 30 is fixed to the battery frame 20 via the ductile members 52, 54.

The following describes effects of the battery mounting structure 10 for a vehicle, thus configured, according to the first embodiment of the present invention.

When the vehicle has a side collision, part of a collision load input herein is transmitted to the battery frame 20 made of fiber reinforced resin. Here, the ductile members 52, 54 are provided, respectively, over the first fastening portion 40 and the second fastening portion 50 in the vehicle front side of the battery frame 20, and over the first fastening portion 40 and the second fastening portion 50 in the vehicle rear side of the battery frame 20.

Accordingly, even if part of the collision load is input into the battery frame 20 having a low distortion limit and a crack (or breaking) occurs between the first fastening portion 40 and the second fastening portion 50, the ductile members 52, 54 can restrain or prevent the fuel cell stack 30 from falling off the battery frame 20.

Note that, even when the vehicle has a front end collision or a rear end collision, it is possible to restrain or prevent the fuel cell stack 30 from falling off the battery frame 20 in a similar manner. Further, even if a load is input into the battery frame 20 from an obstacle on a road surface to cause a crack (or breaking), the ductile members 52, 54 can restrain or prevent the fuel cell stack 30 from falling off the battery frame 20.

Besides, since the ductile members 52, 54 are formed in a flat shape, they can be configured in a simple manner. Further, the ductile members 52, 54 are each provided between the first fastening portion 40 and the second fastening portion 50 adjacent to each other, so that they can be configured in a compact manner. Accordingly, even in a configuration provided with the ductile members 52, 54, it is possible to restrain an increase in weight of the vehicle and an increase in manufacturing cost.

Modification of Fourth Embodiment

Figure 4:
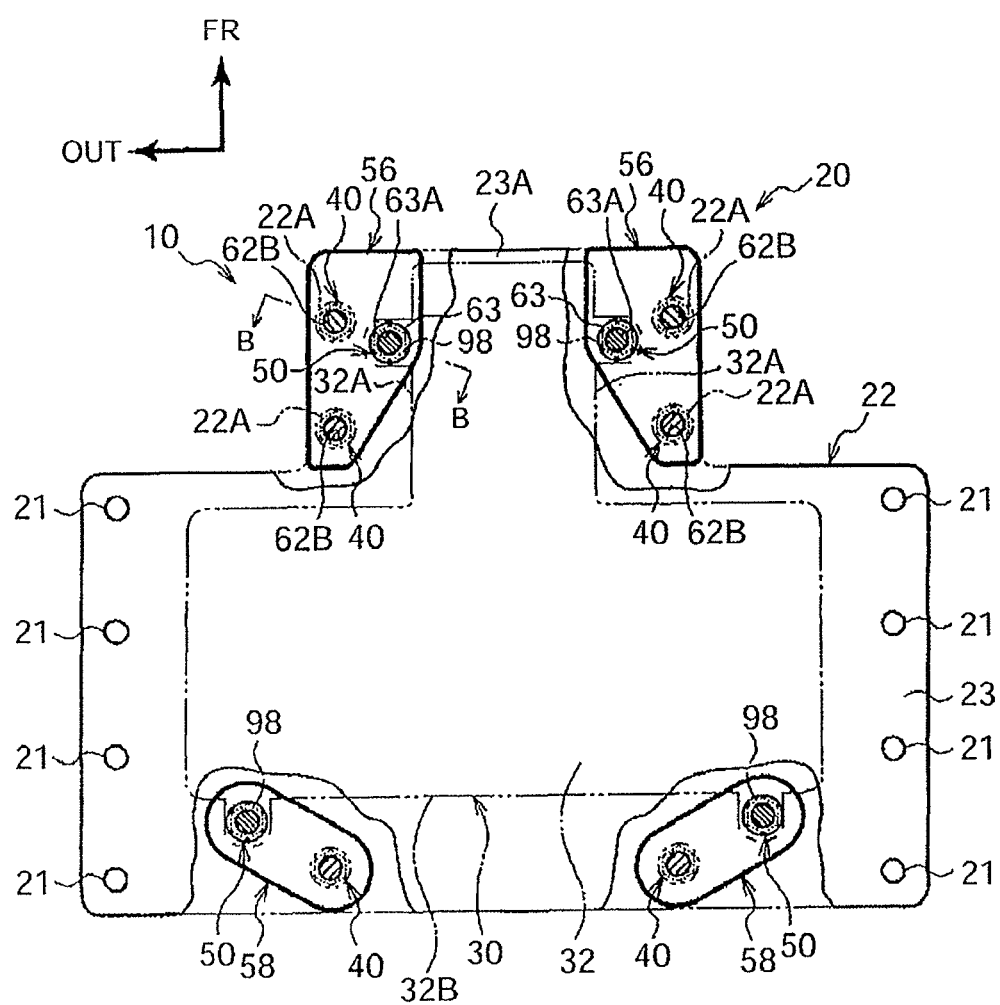
FIG. 4 is a plan view illustrating a modification of the battery mounting structure for a vehicle according to the first embodiment.
Figure 5:
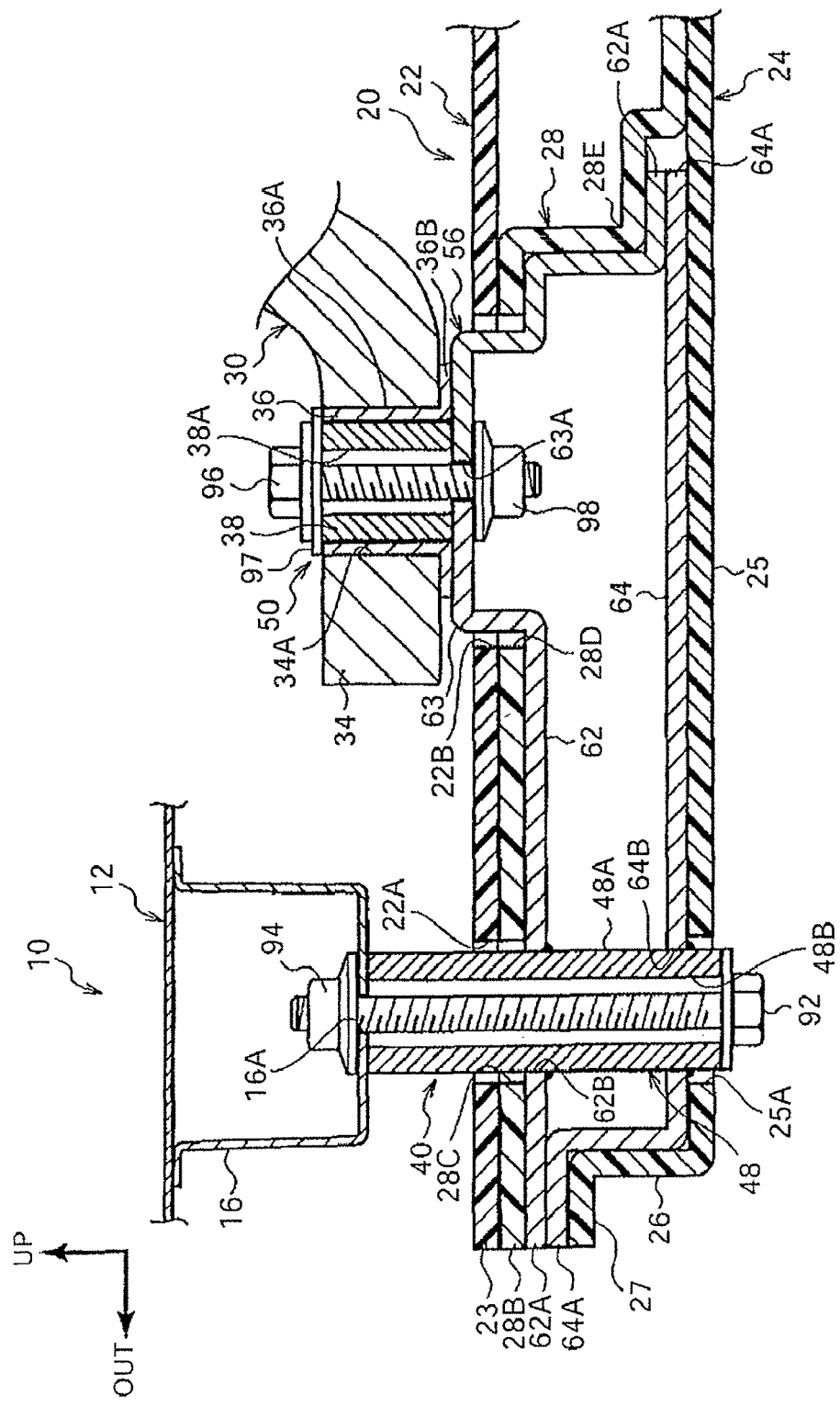
FIG. 5 is a sectional view taken along an arrow B-B in FIG. 4.

The following describes a modification of the first embodiment. As illustrated in FIGS. 4, 5, ductile members 56, 58 according to the present modification are each configured to have a closed section shape, and to be provided integrally in a battery frame 20 having a closed section shape.

As illustrated in FIG. 5, the ductile member 56 includes an upper panel 62 as an upper member, and a lower panel 64 as a lower member. The ductile member 56 is configured to have a closed section shape by joining a flange portion 62A of the upper panel 62 to a flange portion 64A of the lower panel 64.

Through holes 62B, 64B communicating with each other in the vehicle-body up-down direction are formed in the upper panel 62 and the lower panel 64, respectively. A collar member 48 is configured to be passed through the through holes 62B, 64B, and an outer peripheral surface 48A of the collar member 48 is joined to the upper panel 62 and the lower panel 64 by welding.

A raised portion 63 projecting toward the vehicle-body upper side and having a circular shape in a plan view is formed in the upper panel 62, and a through hole 63A configured to pass a flange bolt 96 therethrough is formed in a central part of the raised portion 63. A weld nut 98 coaxially communicating with the through hole 63A is provided on a bottom face of the raised portion 63.

The battery frame 20 includes a reinforcing frame 28 provided between an upper frame 22 and a lower frame 24. Through holes 22A, 28C, 25A configured to pass the collar member 48 therethrough are formed in the upper frame 22, the reinforcing frame 28, and a bottom portion 25 of the lower frame 24, respectively. Through holes 22B, 28D are formed in the upper frame 22 and the reinforcing frame 28 so that the raised portion 63 projects from a top face of the upper frame 22. A bending portion 28E to bend in a stepped manner is formed in an inner side of the reinforcing frame 28 in the vehicle width direction.

Accordingly, the battery frame 20 is assembled in the following manner. First, the ductile member 56 is provided in the lower frame 24. At this time, a lower end of the collar member 48 is passed through the through hole 25A formed in the bottom portion 25. Then, at least a bottom face of the flange portion 64A of the lower panel 64 of the ductile member 56 is joined to a top face of an overhanging portion 27 of the lower frame 24 with an adhesive.

Then, the reinforcing frame 28 is put on the ductile member 56. At this time, the collar member 48 is passed through the through hole 28C, and the raised portion 63 is passed through the through hole 28D. Further, at least a bottom face of an outer peripheral portion 28B of the reinforcing frame 28 is joined to a top face of the flange portion 62A of the upper panel 62 of the ductile member 56 with an adhesive. Also, a bottom face of the bending portion 28E of the reinforcing frame 28 is joined to the top face of the flange portion 62A of the upper panel 62 of the ductile member 56, and the top face of the bottom portion 25 with an adhesive.

Finally, the upper frame 22 is put on the reinforcing frame 28. At this time, the collar member 48 is passed through the through hole 22A, and the raised portion 63 is passed through the through hole 22B. Then, at least a bottom face of an outer peripheral portion 23 of the upper frame 22 is joined to a top face of the outer peripheral portion 28B of the reinforcing frame 28 with an adhesive. Hereby, the ductile member 56 having a closed section shape is integrally provided in the battery frame 20.

With such a configuration, the ductile member 56 having a closed section shape is provided over a first fastening portion 40 and a second fastening portion 50, so that the first fastening portion 40 can be firmly connected to the second fastening portion 50 and an impact resistance of the battery frame 20 can be improved.

Accordingly, it is possible to effectively restrain occurrence of a crack (or breaking) between the first fastening portion 40 and the second fastening portion 50 at the time when a collision load is input into the battery frame 20. Further, even if a crack (or breaking) occurs between the first fastening portion 40 and the second fastening portion 50, it is possible to stably restrain or prevent a fuel cell stack 30 from falling off the battery frame 20.

Note that a ductile-member-58 side is similar to the ductile-member-56 side, so a description thereof is omitted. Further, the ductile members 52, 54, 56, 58 according to the first embodiment are not limited to the shapes illustrated in the figures, provided that they have shapes that can be provided over the first fastening portion 40 and the second fastening portion 50 adjacent to each other. Accordingly, in the following description, even if a ductile member having a closed section shape and provided over a first fastening portion 40 and a second fastening portion 50 adjacent to each other has a shape different from the shapes illustrated in FIGS. 4, 5, a reference sign 56, 58 is assigned to the ductile member, and a detailed description thereof is omitted herein.

Second Embodiment

Next will be described a second embodiment. Note that a portion equivalent to a portion in the first embodiment (including the modification) has the same reference sign as the portion in the first embodiment, and a detailed description thereof (including common effects) is omitted appropriately.

Further, in the following description, a first fastening portion 40 and a second fastening portion 50 adjacent to each other are assumed as one fastening pair, and a pair on a vehicle left-front side is referred to as a fastening pair 60, a pair on a vehicle right-front side is referred to as a fastening pair 70, a pair on a vehicle left-rear side is referred to as a fastening pair 80, and a pair on a vehicle right-rear side is referred to as a fastening pair 90. That is, the fastening pairs 60, 70, 80, 90 are placed so as to be distanced from each other in the vehicle-body front-rear direction and in the vehicle width direction.

Figure 6:
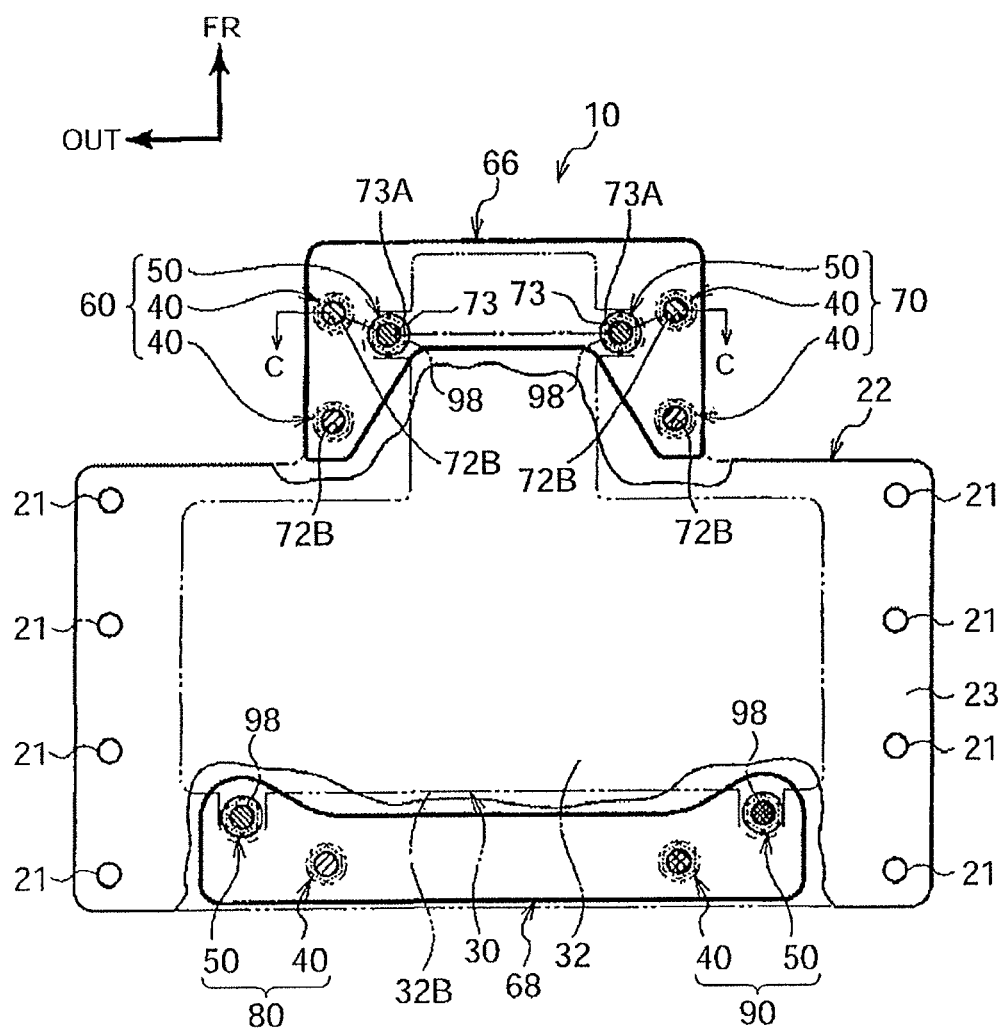
FIG. 6 is a plan view illustrating a battery mounting structure for a vehicle according to a second embodiment.

As illustrated in FIG. 6, in the second embodiment, the fastening pair 60 on the vehicle left side and the fastening pair 70 on the vehicle right side, in the vehicle front side, are connected to each other by a ductile member 66 extending in the vehicle width direction and having a closed section shape. Further, the fastening pair 80 on the vehicle left side and the fastening pair 90 on the vehicle right side, in the vehicle rear side, are connected to each other by a ductile member 68 extending in the vehicle width direction and having a closed section shape. Note that the ductile member 66 and the ductile member 68 have the same configuration, so the description is made by taking the ductile member 66 as an example.

Figure 7:
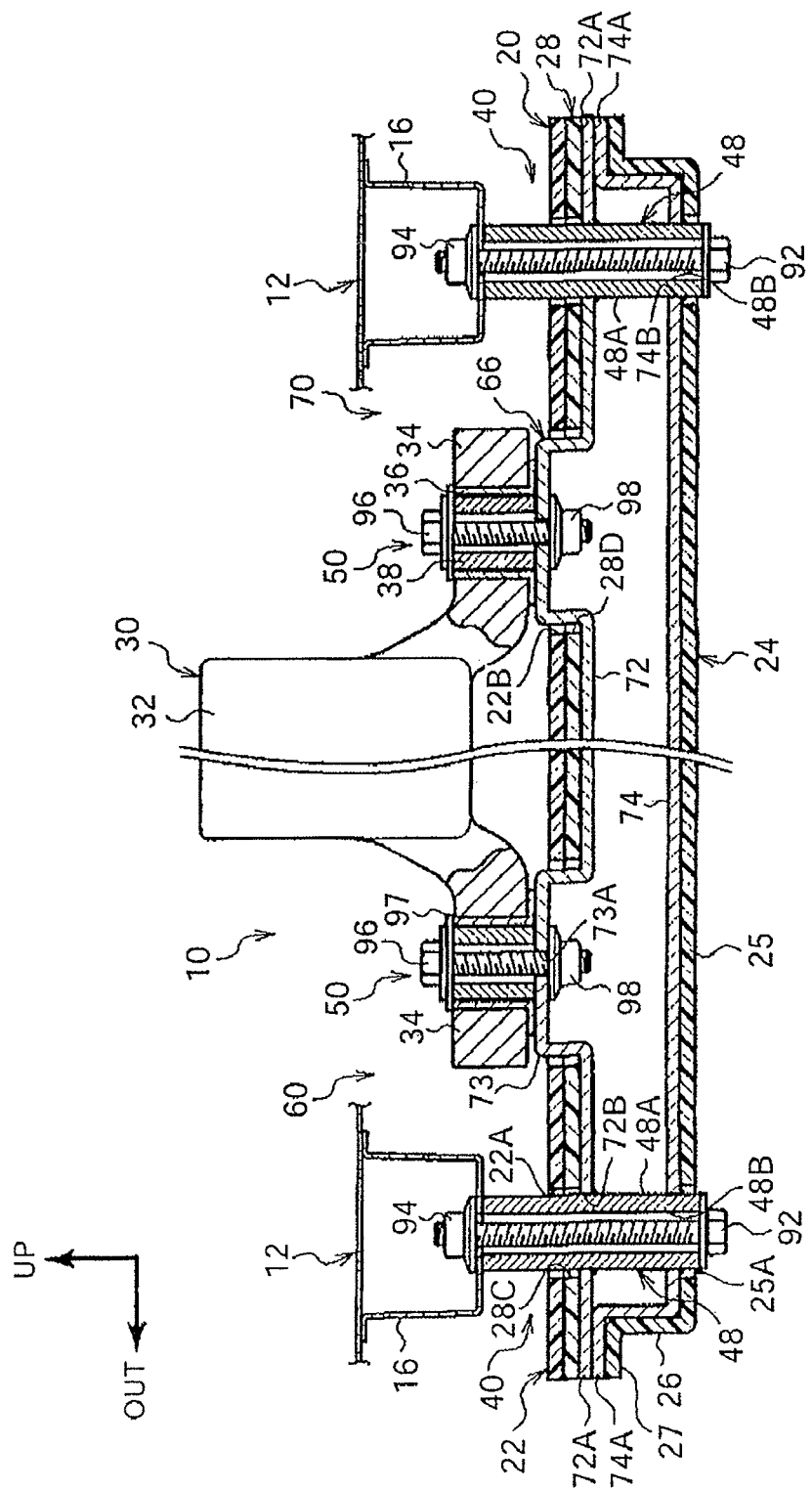
FIG. 7 is a sectional view taken along an arrow C-C in FIG. 6.

As illustrated in FIG. 7, the ductile member 66 includes an upper panel 72 as an upper member, and a lower panel 74 as a lower member. The ductile member 66 is configured to have a closed section shape by joining a flange portion 72A of the upper panel 72 to a flange portion 74A of the lower panel 74.

Through holes 72B, 74B communicating with each other in the vehicle-body up-down direction are formed in the upper panel 72 and the lower panel 74, respectively. A collar member 48 is configured to be passed through the through holes 72B, 74B, and an outer peripheral surface 48A of the collar member 48 is joined to the upper panel 72 and the lower panel 74 by welding.

A raised portion 73 projecting toward the vehicle-body upper side and having a circular shape in a plan view is formed in the upper panel 72, and a through hole 73A configured to pass a flange bolt 96 therethrough is formed in a central part of the raised portion 73. A weld nut 98 coaxially communicating with the through hole 73A is provided on a bottom face of the raised portion 73.

A battery frame 20 includes a reinforcing frame 28 provided between an upper frame 22 and a lower frame 24. Through holes 22A, 28C, 25A configured to pass the collar member 48 therethrough are formed in the upper frame 22, the reinforcing frame 28, and a bottom portion 25 of the lower frame 24, respectively. Through holes 22B, 28D are formed in the upper frame 22 and the reinforcing frame 28 so that the raised portion 73 projects from a top face of the upper frame 22.

Accordingly, by assembling the battery frame 20 similarly to the modification of the first embodiment, the ductile member 66 having a closed section shape is integrally provided in the battery frame 20. Note that, the ductile member 68 is also integrally provided in the battery frame 20 in a similar manner.

In such a configuration, the ductile member 66, 68 having a closed section shape is provided between the first fastening portion 40 and the second fastening portion 50, the fastening pair 60 on the vehicle left-front side is connected to the fastening pair 70 on the vehicle right-front side in the vehicle width direction by the ductile member 66 having a closed section shape, and the fastening pair 80 on the vehicle left-rear side is connected to the fastening pair 90 on the vehicle right-rear side in the vehicle width direction by the ductile member 68 having a closed section shape.

Accordingly, it is possible to effectively restrain not only occurrence of a crack (or breaking) between the first fastening portion 40 and the second fastening portion 50 at the time when a collision load is input into the battery frame 20, but also occurrence of a crack (or breaking) between the fastening pair 60 on the vehicle left-front side and the fastening pair 70 on the vehicle right-front side and occurrence of a crack (or breaking) between the fastening pair 80 on the vehicle left-rear side and the fastening pair 90 on the vehicle right-rear side at the time when a collision load is input from the vehicle-body front-rear direction in particular.

Even if a crack (or breaking) occurs between the first fastening portion 40 and the second fastening portion 50, a crack (or breaking) occurs between the fastening pair 60 on the vehicle left-front side and the fastening pair 70 on the vehicle right-front side, or a crack (or breaking) occurs between the fastening pair 80 on the vehicle left-rear side and the fastening pair 90 on the vehicle right-rear side, it is possible to stably restrain or prevent a fuel cell stack 30 from falling off the battery frame 20.

Note that the ductile members 66, 68 in the second embodiment are not limited to the shapes illustrated in the figures, provided that the ductile members 66, 68 have shapes that allow the fastening pair 60 on the vehicle left-front side to be connected to the fastening pair 70 on the vehicle right-front side in the vehicle width direction and the fastening pair 80 on the vehicle left-rear side to be connected to the fastening pair 90 on the vehicle right-rear side in the vehicle width direction. Accordingly, in the following description, respective ductile members for connecting left and right fastening pairs 60, 70 to each other and for connecting left and right fastening pairs 80, 90 to each other have reference signs 66, 68 even if they have shapes different from the shapes illustrated in FIGS. 6, 7, and detailed descriptions thereof are omitted herein.

Third Embodiment

Next will be described a third embodiment. Note that a portion equivalent to a portion in the first embodiment and the second embodiment has the same reference sign as the portion in the first embodiment and the second embodiment, and a detailed description thereof (including common effects) is omitted appropriately.

Figure 8:
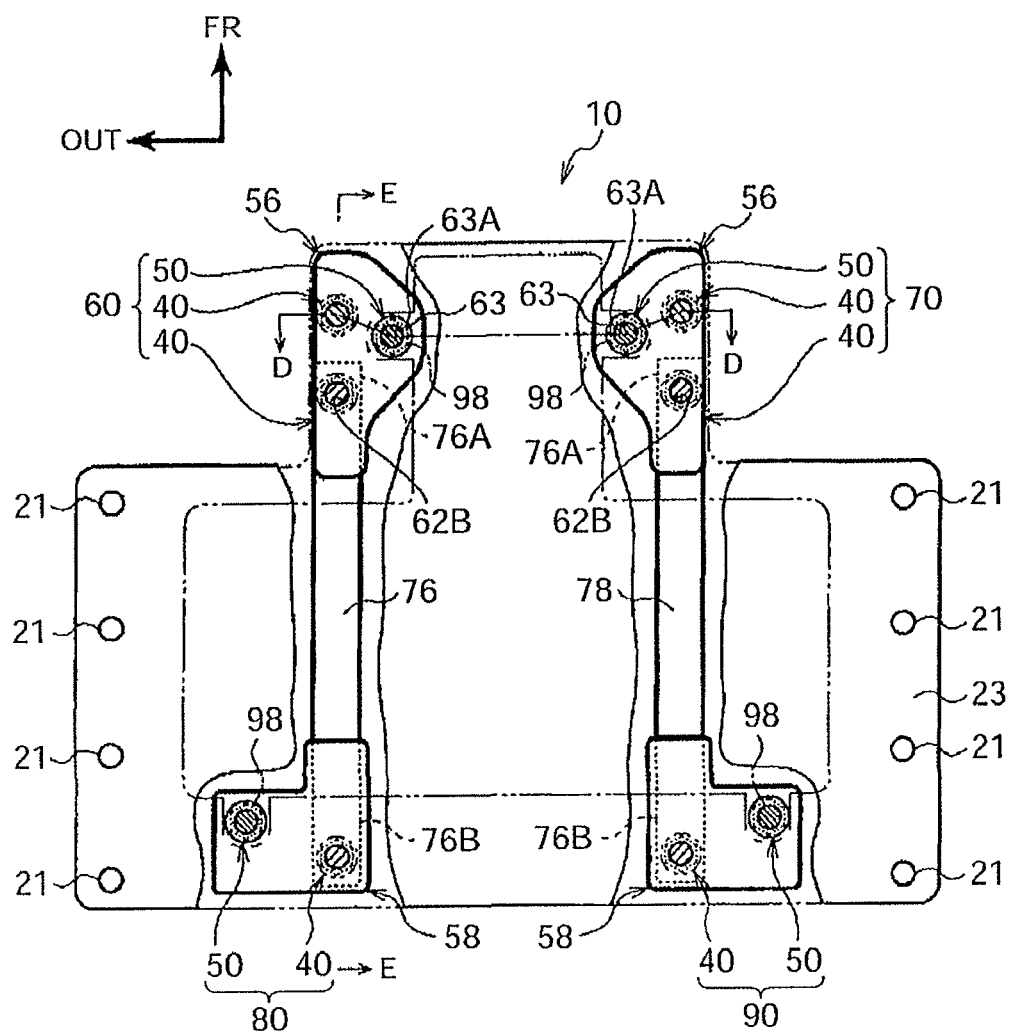
FIG. 8 is a plan view illustrating a battery mounting structure for a vehicle according to a third embodiment.

As illustrated in FIG. 8, in the third embodiment, a fastening pair 60 on the vehicle front side and a fastening pair 80 on the vehicle rear side, in the vehicle left side, are connected to each other by a flat ductile member 76 extending in the vehicle-body front-rear direction, and a fastening pair 70 on the vehicle front side and a fastening pair 90 on the vehicle rear side, in the vehicle right side, are connected to each other by a flat ductile member 78 extending in the vehicle-body front-rear direction.

Figure 9:
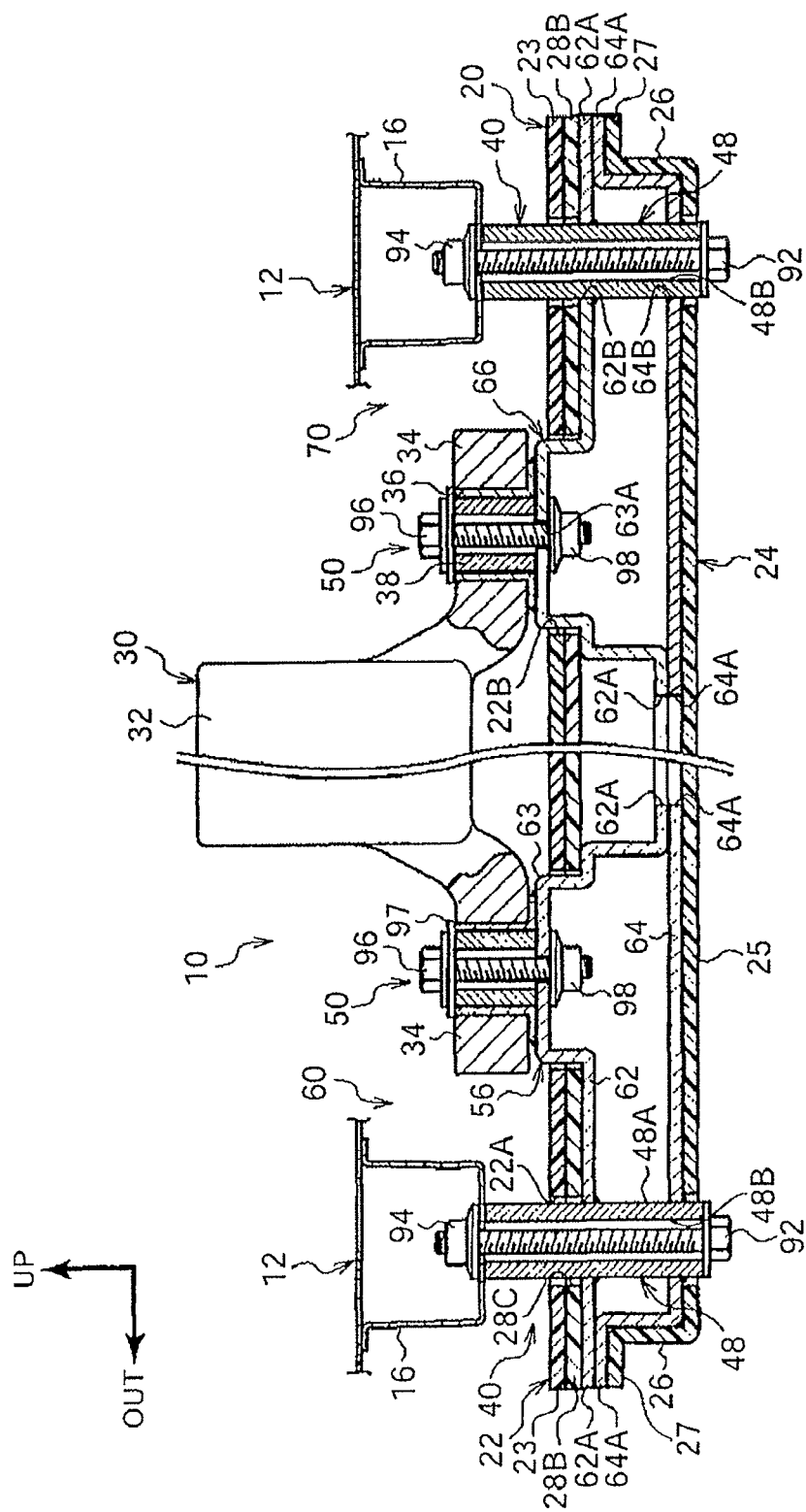
FIG. 9 is a sectional view taken along an arrow D-D in FIG. 8.

In other words, a ductile member 56 on the vehicle front side and a ductile member 58 on the vehicle rear side, in the vehicle left side, are connected to each other by the ductile member 76, and a ductile member 56 on the vehicle front side and a ductile member 58 on the vehicle rear side, in the vehicle right side, are connected to each other by the ductile member 78. Note that, as illustrated in FIG. 9, the ductile members 56, 58 have the same configuration as in the first embodiment. Further, the ductile member 76 and the ductile member 78 have the same configuration, so the description is made by taking the ductile member 76 as an example.

Figure 10:
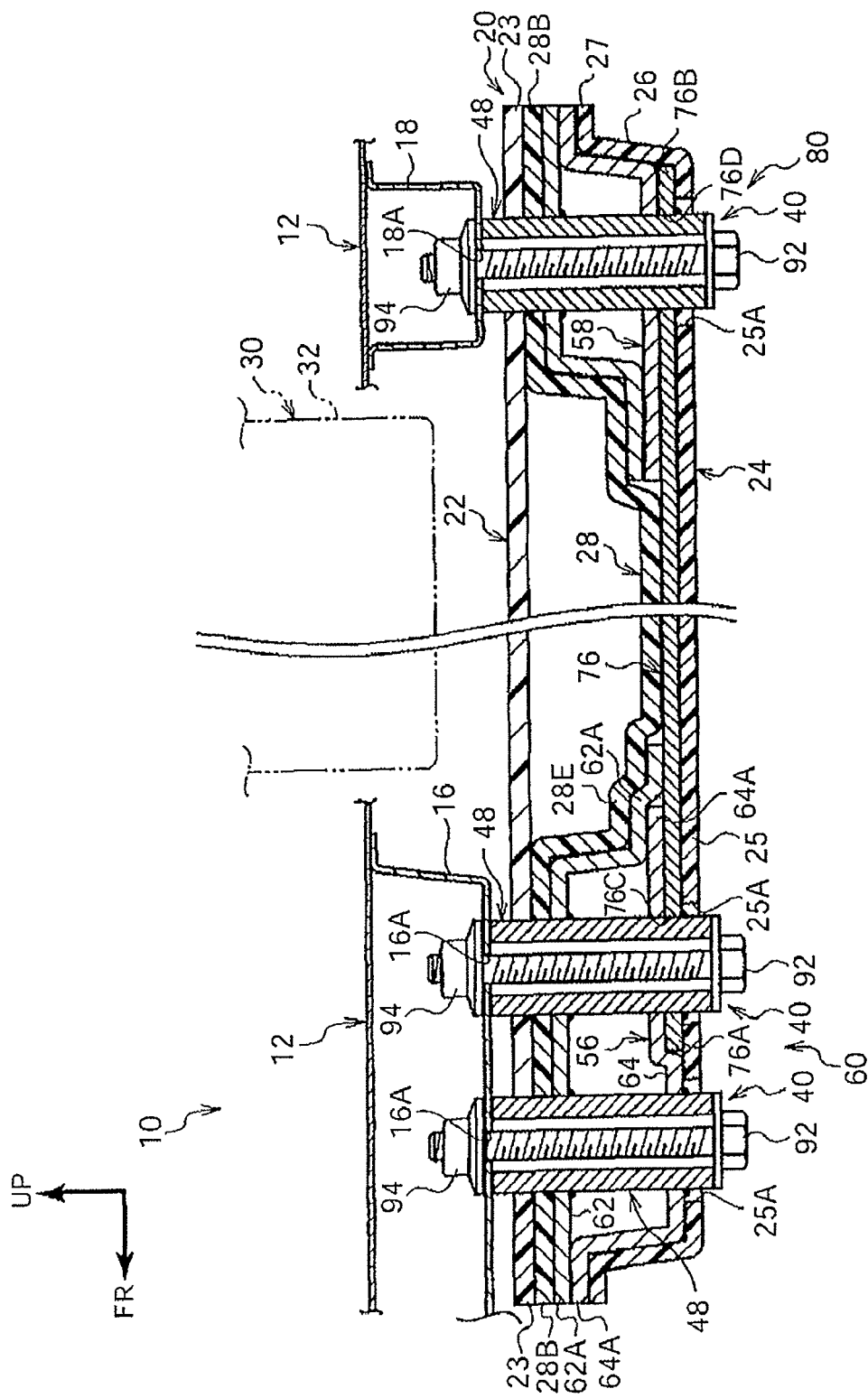
FIG. 10 is a sectional view taken along an arrow E-E in FIG. 8.

As illustrated in FIG. 10, the ductile member 76 provided in the vehicle left side is configured to connect a first fastening portion 40 of the fastening pair 60 to a first fastening portion 40 of the fastening pair 80. More specifically, in the vehicle left side, a rear-side first fastening portion 40 out of the first fastening portions 40 aligned in a front-rear direction in the fastening pair 60 is configured such that a front end 76A of the ductile member 76 is placed between the ductile member 56 and a bottom portion 25 of a lower frame 24, so as to be joined thereto, and a collar member 48 is passed through a through hole 76C of the front end 76A. Further, a first fastening portion 40 of the fastening pair 80 is configured such that a rear end 76B of the ductile member 76 is placed between the ductile member 58 and the bottom portion 25 of the lower frame 24 so as to be joined thereto, and a collar member 48 is passed through a through hole 76D of the rear end.

In such a configuration, the ductile member 56, 58 having a closed section shape is provided over the first fastening portion 40 and the second fastening portion 50, the fastening pair 60 (the ductile member 56) on the vehicle left-front side and the fastening pair 80 (the ductile member 58) on the vehicle left-rear side are connected to each other by the ductile member 76 in the vehicle-body front-rear direction, and the fastening pair 70 (the ductile member 56) on the vehicle right-front side and the fastening pair 90 (the ductile member 58) on the vehicle right-rear side are connected to each other by the ductile member 78 in the vehicle-body front-rear direction.

Accordingly, it is possible to effectively restrain not only occurrence of a crack (or breaking) between the first fastening portion 40 and the second fastening portion 50 at the time when a collision load is input into a battery frame 20, but also occurrence of a crack (or breaking) between the fastening pair 60 on the vehicle left-front side and the fastening pair 80 on the vehicle left-rear side and occurrence of a crack (or breaking) between the fastening pair 70 on the vehicle right-front side and the fastening pair 90 on the vehicle right-rear side at the time when a collision load is input from the vehicle width direction in particular.

Even if a crack (or breaking) occurs between the first fastening portion 40 and the second fastening portion 50, a crack (or breaking) occurs between the fastening pair 60 on the vehicle left-front side and the fastening pair 80 on the vehicle left-rear side, or a crack (or breaking) occurs between the fastening pair 70 on the vehicle right-front side and the fastening pair 90 on the vehicle right-rear side, it is possible to stably restrain or prevent a fuel cell stack 30 from falling off the battery frame 20.

Besides, the left and right ductile members 76, 78 each connect the ductile member 56 to the ductile member 58 so as to include the first fastening portion 40 in the fastening pair 60, 70 on the vehicle front side, and the first fastening portion 40 in the fastening pair 80, 90 on the vehicle rear side, thereby making it possible to further improve strength (rigidity) of the battery frame 20.

Modification of Third Embodiment

Figure 11:
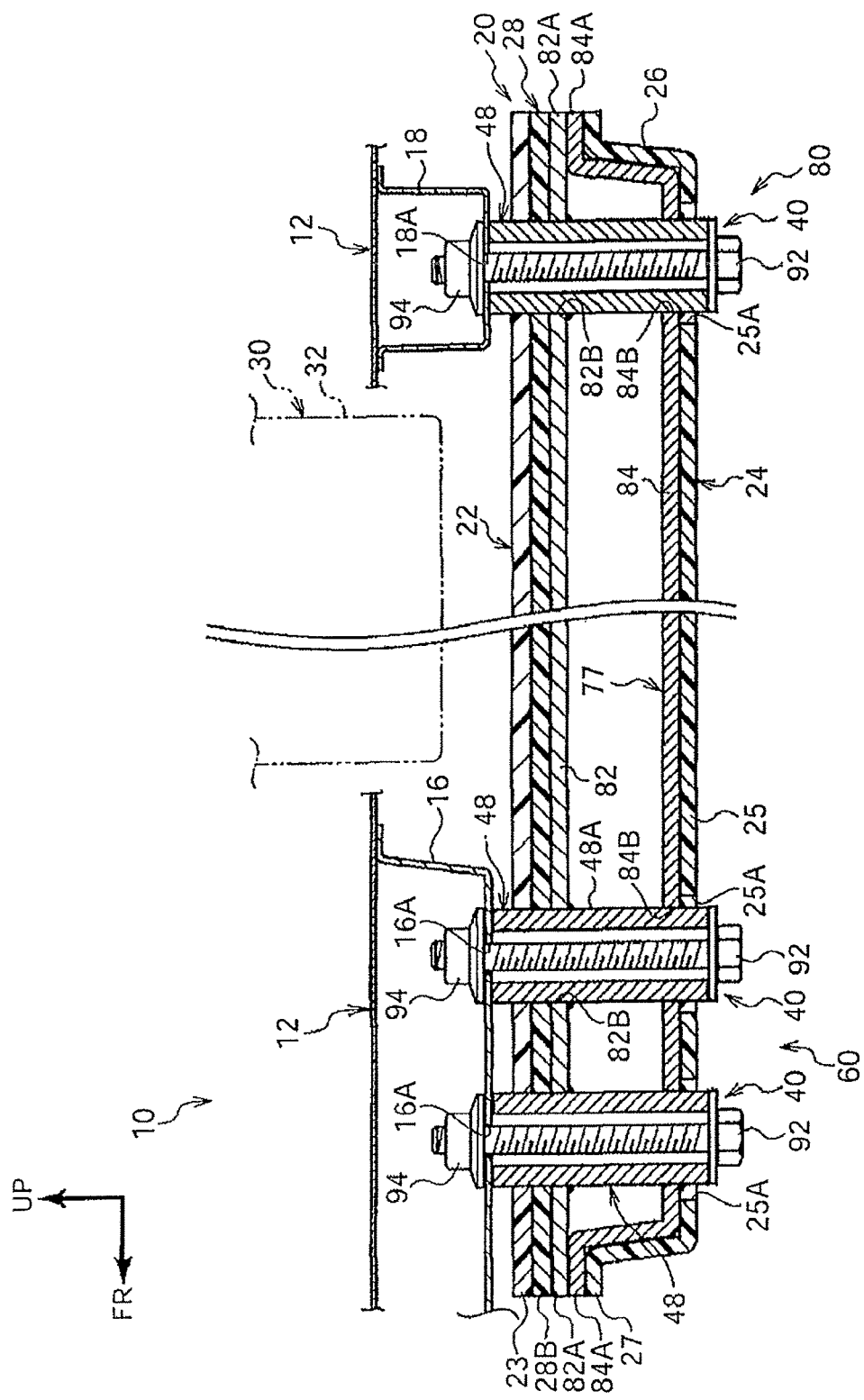
FIG. 11 is a sectional view illustrating a modification of the battery mounting structure for a vehicle according to the third embodiment.

Next will be described a modification of the third embodiment. As illustrated in FIG. 11, each ductile member 77 according to the present modification is configured to have a closed section shape extending in the vehicle-body front-rear direction, so as to connect a fastening pair 60 on the vehicle left-front side to a fastening pair 80 on the vehicle left-rear side or to connect a fastening pair 70 on the vehicle right-front side to a fastening pair 90 on the vehicle right-rear side.

The ductile member 77 includes an upper panel 82 as an upper member, and a lower panel 84 as a lower member. The ductile member 77 is configured to have a closed section shape by joining a flange portion 82A of the upper panel 82 to a flange portion 84A of the lower panel 84.

Through holes 82B, 84B communicating with each other in the vehicle-body up-down direction are formed in the upper panel 82 and the lower panel 84, respectively. A collar member 48 is configured to be passed through the through holes 82B, 84B, and an outer peripheral surface 48A of the collar member 48 is joined to the upper panel 82 and the lower panel 84 by welding.

Although not illustrated herein, a raised portion projecting toward the vehicle-body upper side and having a circular shape in a plan view is formed in the upper panel 82, and a through hole configured to pass a flange bolt 96 therethrough is formed in a central part of the raised portion. A weld nut 98 coaxially communicating with the through hole is provided on a bottom face of the raised portion.

In such a configuration, the ductile member 77 having a closed section shape is provided over the first fastening portion 40 and the second fastening portion 50, the fastening pair 60 on the vehicle left-front side is connected to the fastening pair 80 on the vehicle left-rear side in the vehicle-body front-rear direction by the ductile member 77 having a closed section shape, and the fastening pair 70 on the vehicle right-front side is connected to the fastening pair 90 on the vehicle right-rear side in the vehicle-body front-rear direction by the ductile member 77 having a closed section shape.

Accordingly, it is possible to more effectively restrain not only occurrence of a crack (or breaking) between the first fastening portion 40 and the second fastening portion 50 at the time when a collision load is input into a battery frame 20, but also occurrence of a crack (or breaking) between the fastening pair 60 on the vehicle left-front side and the fastening pair 80 on the vehicle left-rear side and occurrence of a crack (or breaking) between the fastening pair 70 on the vehicle right-front side and the fastening pair 90 on the vehicle right-rear side at the time when a collision load is input from the vehicle width direction in particular.

Even if a crack (or breaking) occurs between the first fastening portion 40 and the second fastening portion 50, a crack (or breaking) occurs between the fastening pair 60 on the vehicle left-front side and the fastening pair 80 on the vehicle left-rear side, or a crack (or breaking) occurs between the fastening pair 70 on the vehicle right-front side and the fastening pair 90 on the vehicle right-rear side, it is possible to more stably restrain or prevent a fuel cell stack 30 from falling off the battery frame 20.

Fourth Embodiment

Next will be described a fourth embodiment. Note that a portion equivalent to a portion in the first to third embodiments has the same reference sign as the portion in the first to third embodiments, and a detailed description thereof (including common effects) is omitted appropriately. Further, a sectional view taken along an arrow C-C in FIG. 12 is the same as FIG. 7.

Figure 12:
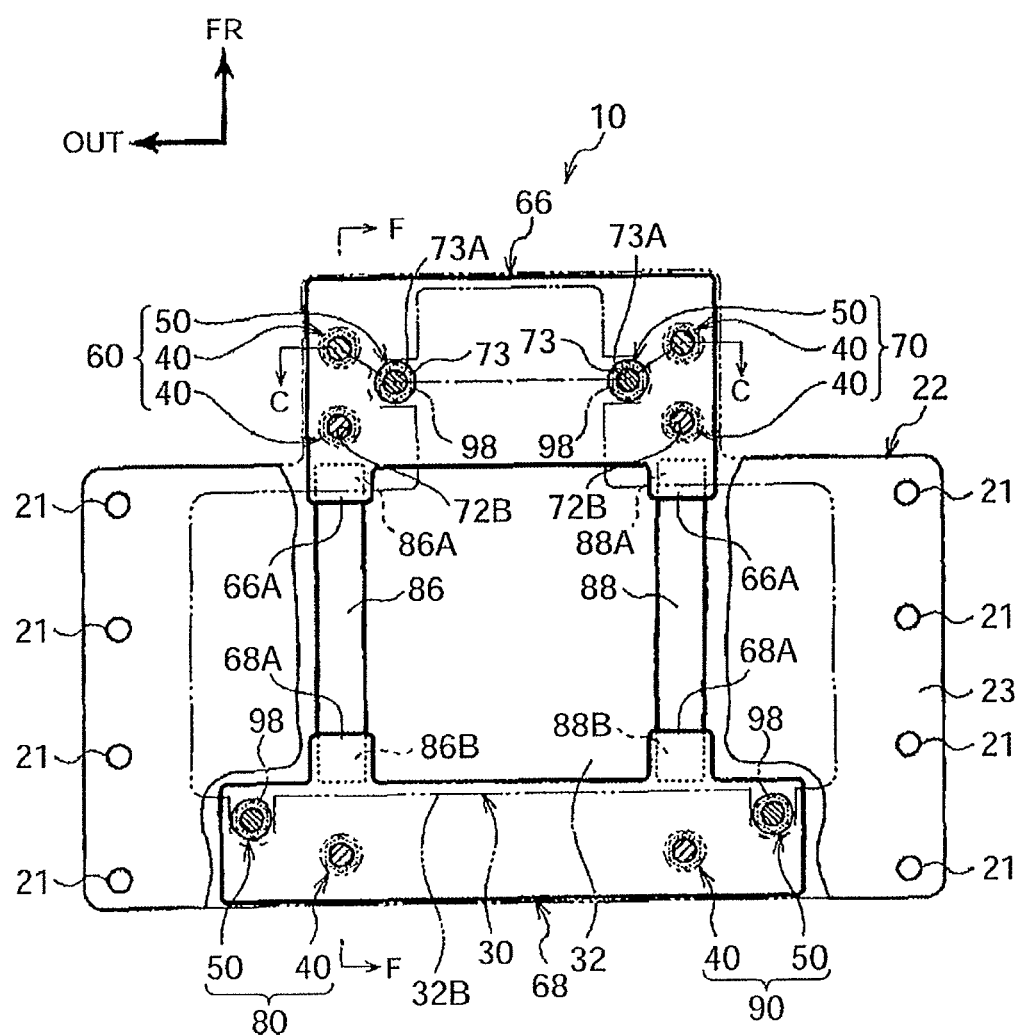
FIG. 12 is a plan view illustrating a battery mounting structure for a vehicle according to a fourth embodiment.
Figure 13:
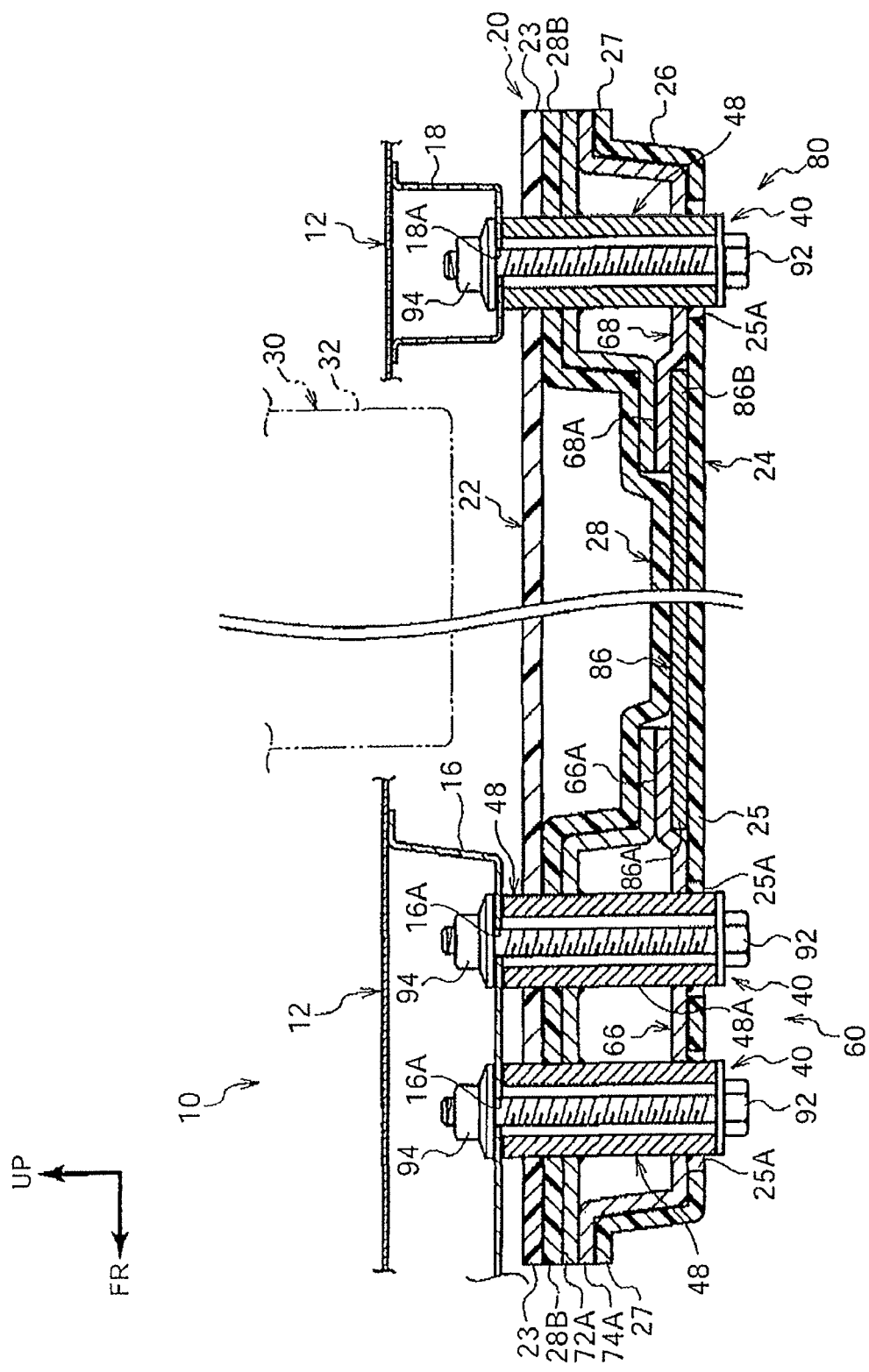
FIG. 13 is a sectional view taken along an arrow F-F in FIG. 12.

As illustrated in FIGS. 12, 13, the fourth embodiment is an embodiment in which the second embodiment is combined with the third embodiment. That is, a fastening pair 60 on the vehicle left side and a fastening pair 70 on the vehicle right side, in the vehicle front side, are connected to each other by a ductile member 66 extending in the vehicle width direction, and a fastening pair 80 on the vehicle left side and a fastening pair 90 on the vehicle right side, in the vehicle rear side, are connected to each other by a ductile member 68 extending in the vehicle width direction.

Further, in the vehicle left side, the ductile member 66 is connected to the ductile member 68 by a ductile member 86 extending in the vehicle-body front-rear direction, and in the vehicle right side, the ductile member 66 is connected to the ductile member 68 by a ductile member 88 extending in the vehicle-body front-rear direction. More specifically, respective front ends 86A, 88A of the ductile members 86, 88 are joined to rear ends 66A of the ductile member 66, and respective rear ends 86B, 88B of the ductile members 86, 88 are joined to front ends 68A of the ductile member 68.

In such a configuration, the ductile member 66, 68 having a closed section shape is provided over a first fastening portion 40 and a second fastening portion 50, the fastening pair 60 (the ductile member 66) on the vehicle left-front side and the fastening pair 80 (the ductile member 68) on the vehicle left-rear side are connected to each other by the ductile member 86 in the vehicle-body front-rear direction, and the fastening pair 70 (the ductile member 66) on the vehicle right-front side and the fastening pair 90 (the ductile member 68) on the vehicle right-rear side are connected to each other by the ductile member 88 in the vehicle-body front-rear direction.

Accordingly, it is possible to effectively restrain not only occurrence of a crack (or breaking) between the first fastening portion 40 and the second fastening portion 50 at the time when a collision load is input into a battery frame 20 from the vehicle-body front-rear direction or the vehicle width direction, but also occurrence of a crack (or breaking) between the fastening pair 60 on the vehicle left-front side and the fastening pair 70 on the vehicle right-front side and a crack (or breaking) between the fastening pair 80 on the vehicle left-rear side and the fastening pair 90 on the vehicle right-rear side, and furthermore, occurrence of a crack (or breaking) between the fastening pair 60 on the vehicle left-front side and the fastening pair 80 on the vehicle left-rear side, and occurrence of a crack (or breaking) between the fastening pair 70 on the vehicle right-front side and the fastening pair 90 on the vehicle right-rear side.

Modification of Fourth Embodiment

Figure 14:
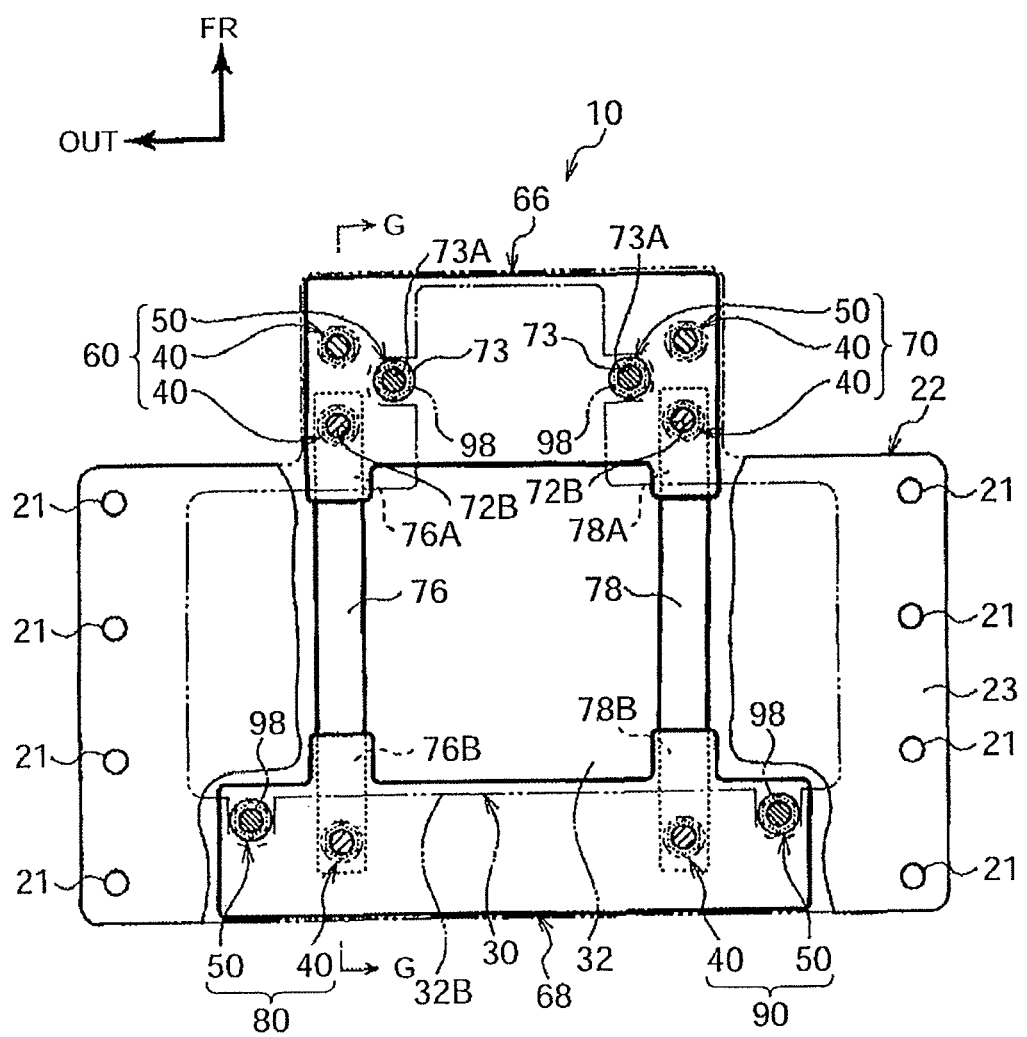
FIG. 14 is a plan view illustrating a modification of the battery mounting structure for a vehicle according to the fourth embodiment.
Figure 15:
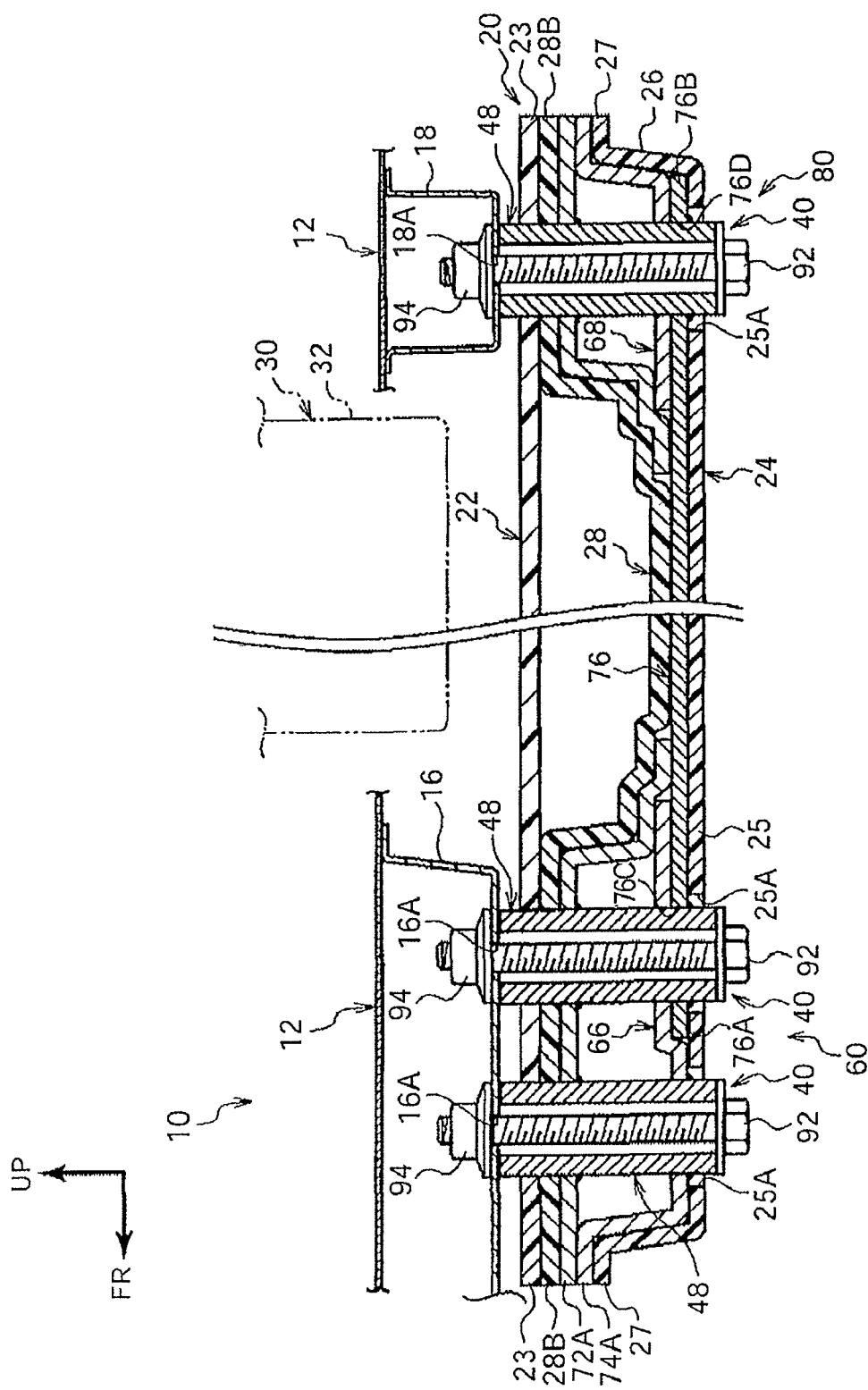
FIG. 15 is a sectional view taken along an arrow G-G in FIG. 14.

Next will be described a modification of the fourth embodiment. As illustrated in FIGS. 14, 15, first fastening portions 40 in fastening pairs 60, 70 on the vehicle front side may be configured to be connected to first fastening portions 40 in fastening pairs 80, 90 on the vehicle rear side by left and right ductile members 76, 78, respectively.

That is, for example, in the vehicle left side, a rear-side first fastening portion 40 out of the first fastening portions 40 aligned in a front-rear direction in the fastening pair 60 is configured such that a front end 76A of the ductile member 76 is placed between a ductile member 66 and a bottom portion 25 of a lower frame 24 so as to be joined thereto, and a collar member 48 is passed through a through hole 76C of the front end 76A. Further, a first fastening portion 40 of the fastening pair 80 is configured such that a rear end 76B of the ductile member 76 is placed between a ductile member 68 and the bottom portion 25 of the lower frame 24 so as to be joined thereto, and a collar member 48 is passed through a through hole 76D of the rear end 76B.

In such a configuration, the left and right ductile members 76, 78 are each joined so as to include the first fastening portion 40 in the fastening pair 60, 70 on the vehicle front side, and the first fastening portion 40 in the fastening pair 80, 90 on the vehicle rear side, thereby connecting the ductile member 66 to the ductile member 68. This makes it possible to further improve strength (rigidity) of a battery frame 20.

Further, in a case of the ductile members 86, 88 in which the front ends 86A, 88A are joined to rear ends 66A of the ductile member 66 and rear ends 86B, 88B are joined to front ends 68A of the ductile member 68, when an excessive load is input into the battery frame 20, a breakage (detachment) may be caused in joint portions thereof. However, in a case of the ductile members 76, 78, the ductile members 76, 78 are joined so as to include the first fastening portions 40 on the vehicle front side and the first fastening portions 40 on the vehicle rear side, so that such a problem does not occur.

The battery mounting structure 10 for a vehicle according to the present embodiment has been described with reference to the drawings. However, the battery mounting structure 10 for a vehicle according to the present embodiment is not limited to those illustrated in the drawings, and its design is modifiable appropriately within a range that does not deviate from the gist of the present invention. For example, the ductile member (a metallic component) according to the present embodiment is not limited to a member molded by use of a high strength steel plate or an ultrahigh strength steel plate, but may be molded by use of aluminum alloy, iron, or the like with some hardness.

Further, the ductile member according to the present embodiment is not limited to a configuration in which the ductile member is joined to the battery frame 20 with an adhesive, but may be configured to be joined by use of a connecting member such as a rivet. Further, joining of the ductile members 76, 78 to the ductile members 56, 58, joining of the ductile members 76, 78 or the ductile members 86, 88 to the ductile members 66, 68, and further, joining of the flange portion of the upper panel to the flange portion of the lower panel may be performed by spot welding, an adhesive, and the like, and are not limited in particular.

Further, the ductile member according to the present embodiment is not limited to a configuration in which the ductile member is provided over the first fastening portion 40 and the second fastening portion 50 adjacent to each other. Further, the battery frame 20 according to the present embodiment is not limited to a configuration to support the fuel cell stack 30.

DESCRIPTION OF THE REFERENCE NUMERALS

10/ battery mounting structure for vehicle
12/ floor panel (vehicle body)
20/ battery frame
22/ upper frame (battery frame upper)
23/ outer peripheral portion
24/ lower frame (battery frame lower)
27/ projecting portion (outer peripheral portion)
30/ fuel cell stacks (battery)
40/ first fastening portion
50/ second fastening portion
52/ ductile member
54/ ductile member
56/ ductile member
58/ ductile member
60/ fastening pair
62/ upper panel (upper member)
64/ lower panel (lower member)
66/ ductile member
68/ ductile member
70/ fastening pair
72/ upper panel (upper member)
74/ lower panel (lower member)
76/ ductile member
77/ ductile member 78/ ductile member
80/ fastening pair
82/ upper panel (upper member)
84/ lower panel (lower member)
86/ ductile member
88/ ductile member
90/ fastening pair

What is claimed is:

1. A battery mounting structure for a vehicle, comprising:
    a battery frame made of fiber reinforced resin and fastened and fixed to a vehicle body via a plurality of first fastening portions;
    a battery fastened and fixed to the battery frame via a plurality of second fastening portions; and
    a ductile member provided over the first fastening portion and the second fastening portion, wherein
    the ductile member is made of metal.

2. The battery mounting structure for a vehicle, according to claim 1, wherein
    the ductile member is provided over the first fastening portion and the second fastening portion adjacent to each other.

3. The battery mounting structure for a vehicle, according to claim 1, wherein:
    a plurality of fastening pairs each including the first fastening portion and the second fastening portion adjacent to each other is placed so as to be distanced from each other in a vehicle-body front-rear direction and in a vehicle width direction; and
    the ductile member is extended so as to connect the plurality of fastening pairs in the vehicle-body front-rear direction or in the vehicle width direction.

4. The battery mounting structure for a vehicle, according to claim 1, wherein:
    a plurality of fastening pairs each including the first fastening portion and the second fastening portion adjacent to each other is placed so as to be distanced from each other in a vehicle-body front-rear direction and in a vehicle width direction; and
    the ductile member is extended so as to connect the plurality of fastening pairs in the vehicle-body front-rear direction and in the vehicle width direction.

5. The battery mounting structure for a vehicle according to claim 1, wherein
    the ductile member is formed in a flat shape.

6. The battery mounting structure for a vehicle according to claim 1, wherein:
    the battery frame includes a battery frame upper and a battery frame lower configured such that their outer peripheral portions are joined to each other so as to form a closed section; and
    the ductile member is provided inside the closed section.

7. The battery mounting structure for a vehicle, according to claim 6, wherein:
    the ductile member includes an upper member and a lower member configured such that their flange portions are joined to each other so as to form a closed section; and
    a flange portion of the upper member and a flange portion of the lower member, in the outer peripheral portion side, are sandwiched between the outer peripheral portion of the battery frame upper and the outer peripheral portion of the battery frame lower, so as to be joined to each other.

* * * * *